(12) United States Patent
Yamada et al.

(10) Patent No.: US 9,855,829 B2
(45) Date of Patent: Jan. 2, 2018

(54) AUTOMOBILE BELTLINE PORTION SOUND INSULATING STRUCTURE AND AUTOMOBILE DOOR GLASS

(71) Applicant: Asahi Glass Company, Limited, Chiyoda-ku (JP)

(72) Inventors: Daisuke Yamada, Chiyoda-ku (JP); Atsushi Nakamura, Chiyoda-ku (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/223,491

(22) Filed: Jul. 29, 2016

(65) Prior Publication Data
US 2017/0028830 A1    Feb. 2, 2017

(30) Foreign Application Priority Data

Jul. 31, 2015 (JP) ................................ 2015-151864
Jun. 3, 2016 (JP) ................................ 2016-111691

(51) Int. Cl.
*B60J 1/16* (2006.01)
*B60J 10/50* (2016.01)
(Continued)

(52) U.S. Cl.
CPC ............. *B60J 10/50* (2016.02); *B60J 1/08* (2013.01); *B60J 1/2097* (2013.01); *B60J 10/32* (2016.02);
(Continued)

(58) Field of Classification Search
CPC ... B60J 10/50; B60J 1/2097; B60J 1/08; B60J 10/40; B60J 10/32; B60J 10/75; E06B 7/2305
(Continued)

(56) References Cited

U.S. PATENT DOCUMENTS

| 1,911,697 A | * | 5/1933 | Levan | .................... B60J 1/2097 |
| | | | | 292/18 |
| 1,954,268 A | * | 4/1934 | Simpson | .................. B60J 10/75 |
| | | | | 49/377 |

(Continued)

FOREIGN PATENT DOCUMENTS

DE    3617602 A1 * 11/1987 ............... B60J 10/75
DE    3935629 A1 *  5/1991 ................ B60J 1/17
(Continued)

OTHER PUBLICATIONS

Extended European Search Report dated Jan. 31, 2017 in Patent Application No. 16001666.3.

*Primary Examiner* — Jerry Redman
(74) *Attorney, Agent, or Firm* — Oblon, McClelland, Maier & Neustadt, L.L.P.

(57) ABSTRACT

To provide an automobile beltline portion sound insulating structure capable of improving a sound insulation state of an automobile interior at a door glass closed time to a high level and an automobile door glass. An automobile beltline portion sound insulating structure including a door panel having two panel boards facing each other having seal members along the beltline respectively, and a door glass provided between the two panel boards having a main body and a first viscoelastic member having a Young's modulus lower than that of the seal member, in a lower portion of one main surface of the main body, the seal member positioned on the side of the one main surface having two or more lip portions, wherein the first viscoelastic member is positioned between the two lip portions while abutting on at least a part of the seal member at the door glass closed time.

8 Claims, 3 Drawing Sheets

(51) Int. Cl.
  *E06B 7/23* (2006.01)
  *B60J 1/08* (2006.01)
  *B60J 10/32* (2016.01)
  *B60J 10/40* (2016.01)
  *B60J 10/75* (2016.01)
  *B60J 1/20* (2006.01)

(52) U.S. Cl.
  CPC ............... *B60J 10/40* (2016.02); *B60J 10/75* (2016.02); *E06B 7/2305* (2013.01)

(58) Field of Classification Search
  USPC .................................................. 49/374, 377
  See application file for complete search history.

(56) References Cited

U.S. PATENT DOCUMENTS

| | | | | |
|---|---|---|---|---|
| 2,069,219 A | * | 2/1937 | Conlon | B60J 1/17 49/377 |
| 2,840,416 A | * | 6/1958 | Woodward | B60J 10/74 296/93 |
| 4,481,736 A | * | 11/1984 | Norton | B60J 10/75 49/373 |
| 5,870,860 A | * | 2/1999 | Heller | B60S 1/0411 49/377 |
| 2006/0168892 A1 | * | 8/2006 | Dohles | B60J 5/0426 49/374 |
| 2017/0028831 A1 | * | 2/2017 | Yamada | B60J 10/50 |

FOREIGN PATENT DOCUMENTS

| | | | |
|---|---|---|---|
| DE | 42 24 486 A1 | 1/1994 | |
| DE | 19706043 A1 * | 6/1998 | .............. B60J 1/008 |
| EP | 0694429 A1 * | 1/1996 | ................ B60J 1/17 |
| EP | 0754585 A1 * | 1/1997 | .............. B60J 10/75 |
| EP | 0768201 A1 * | 4/1997 | ............ B60J 10/265 |
| EP | 0 822 109 A1 | 2/1998 | |
| FR | 2738322 A1 * | 3/1997 | .............. B60J 10/75 |
| JP | 62-6120 U | 1/1987 | |
| JP | 2001-219738 | 8/2001 | |

* cited by examiner

AUTOMOBILE BELTLINE PORTION SOUND INSULATING STRUCTURE AND AUTOMOBILE DOOR GLASS

CROSS REFERENCE TO RELATED APPLICATION

This application is based upon and claims the benefit of priority from the prior Japanese Patent Applications No. 2015-151864, filed on Jul. 31, 2015 and No. 2016-111691, filed on Jun. 3, 2016; the entire contents of which are incorporated herein by reference.

FIELD

The present invention relates to an automobile beltline portion sound insulating structure and an automobile door glass used for the sound insulating structure.

BACKGROUND

As one of methods to enhance an sound insulating property of an automobile interior, there has been conventionally adopted a method of providing a sound insulating structure along a beltline of the automobile. As such a sound insulating structure, for example, Patent Reference 1(JP-A 2001-219738) discloses a sound insulating structure in which, at a door glass closed time, sound insulators are provided in ones of lower end portions of an outer seal portion and an inner seal portion which are mounted on a door panel, and portions corresponding to the lower end portions of the door glass, and projections elastically contacting the sound insulators are provided in the other of the above.

The sound insulating structure described in Patent Reference 1 intends to prevent intrusion of sound from the automobile exterior by closing a gap between the door panel, concretely, the seal portion provided in the door panel and the door glass, at the door glass closed time, and a certain sound insulating effect can be obtained. However, noise of the automobile interior includes, in addition to sound intruding by air propagation from the automobile exterior, sound generated as a result that various members including a door glass vibrate. A sound insulating property of the automobile interior is expected to be improved by suppressing vibration of the door glass in particular, but in the sound insulating structure of Patent Reference 1, a countermeasure against vibration of the door glass is not considered and a high-level sound insulating performance cannot be obtained.

SUMMARY

The present invention is made in view of the above, and its object is to provide an automobile beltline portion sound insulating structure capable of improving a sound insulation state of an automobile interior at a door glass closed time to a high level by suppressing intrusion of sound from the automobile exterior via a beltline portion and occurrence of sound due to vibration of the door glass itself, and an automobile door glass used for that sound insulating structure.

An automobile beltline portion sound insulating structure-formed along a beltline of an automobile, including:
a door panel having two panel boards facing each other, and
a door glass being freely openable and closable by being provided between the two panel boards in a liftable manner, the panel boards having seal members sealing between the door panel and the door glass in regions along the beltline of facing surfaces respectively,
the door glass having a door glass main body and a first viscoelastic member in a lower portion of one main surface of the door glass main body,
the first viscoelastic member having a Young's modulus lower than that of the seal member positioned on a surface of the panel board facing to the one main surface of the door glass main body, and
the seal member positioned on the surface of the panel board facing to the one main surface having at least two lip portions on a side of the door glass,
wherein the first viscoelastic member is positioned between the two lip portions while abutting on at least a part of the seal member positioned on the surface of the panel board facing to the one main surface, at the door glass closed time, to insulate sound between a door panel and a door glass.

The present invention provides an automobile door glass used for the automobile beltline portion sound insulating structure described above, the automobile door glass being made of a glass plate on which the viscoelastic member is mounted.

An automobile beltline portion sound insulating structure of the present invention has a high sound insulating performance, that is, suppressing an amount of sound intruding from the automobile exterior via a beltline portion and suppressing occurrence of sound due to vibration of a door glass itself. Thereby, by using the automobile beltline portion sound insulating structure of the present invention, a high-level sound insulation state can be achieved in the automobile interior at a door glass closed time. An automobile door glass of the present invention, when mounted on an automobile, can constitute the automobile beltline portion sound insulating structure of the present invention which can achieve the high-level sound insulation state in the automobile interior at the door glass closed time.

DETAILED DESCRIPTION

Hereinafter, embodiments of a beltline portion sound insulating structure (hereinafter, also referred to simply as a "sound insulating structure") and an automobile door glass (hereinafter, also referred to simply as a "door glass") of the present invention will be described with reference to the drawings. Note that the present invention is not limited to these embodiments and these embodiments can be altered or modified without departing from the spirit and the scope of the present invention.

Figure 1:
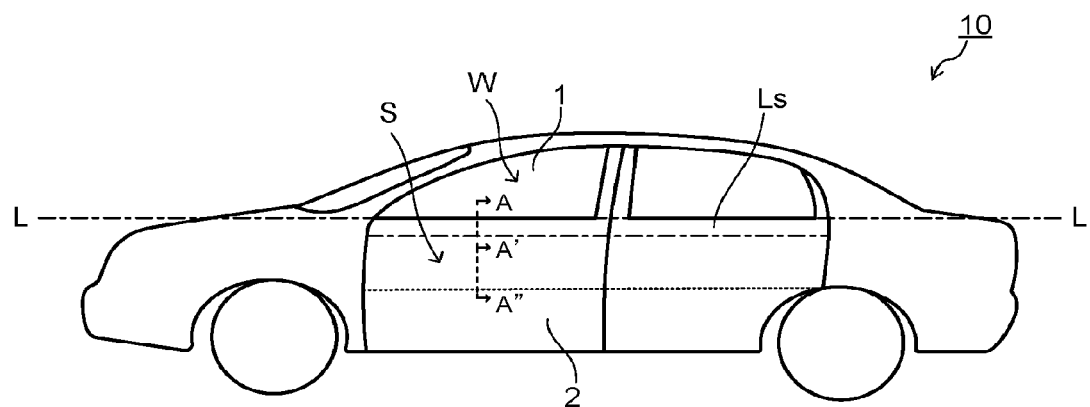
FIG. 1 is a side view of an automobile having a beltline portion sound insulating structure of the present invention.
Figure 2A:
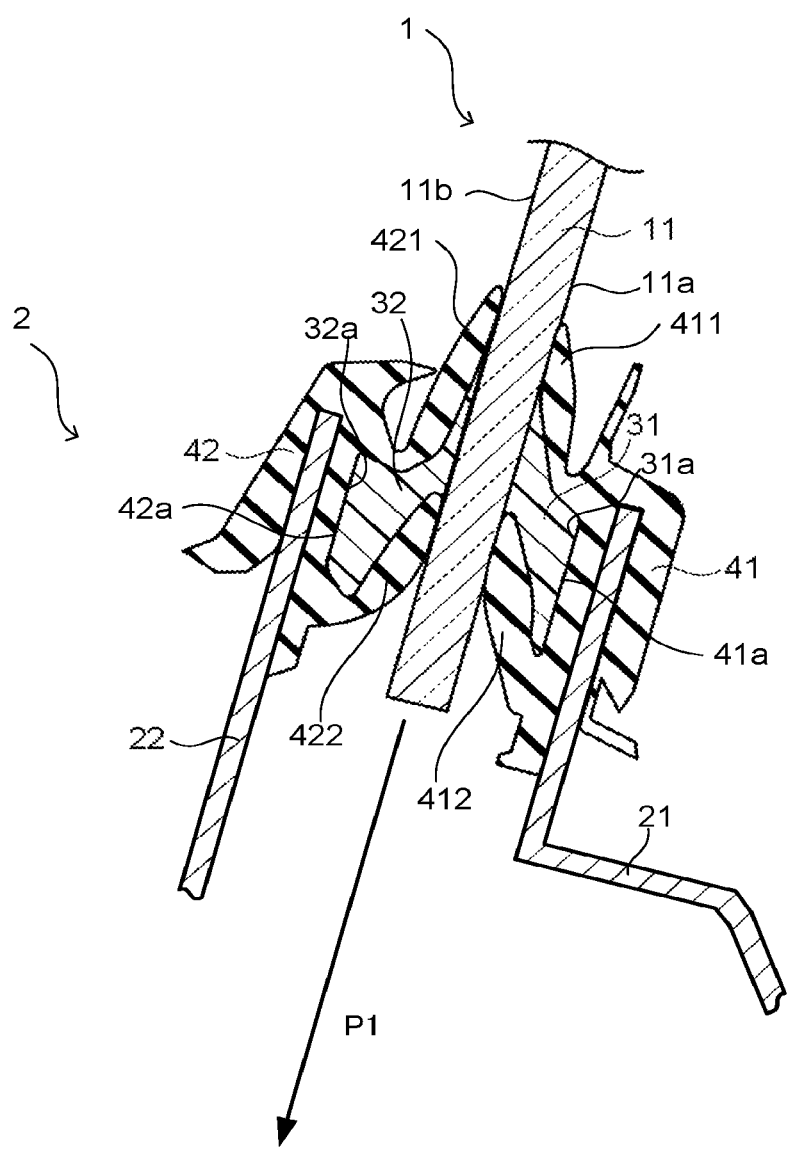
FIG. 2A is an A-A' line cross-sectional view of FIG. 1 which schematically shows a state at a door glass closed time in an example of the beltline portion sound insulating structure of the present invention.
Figure 2B:
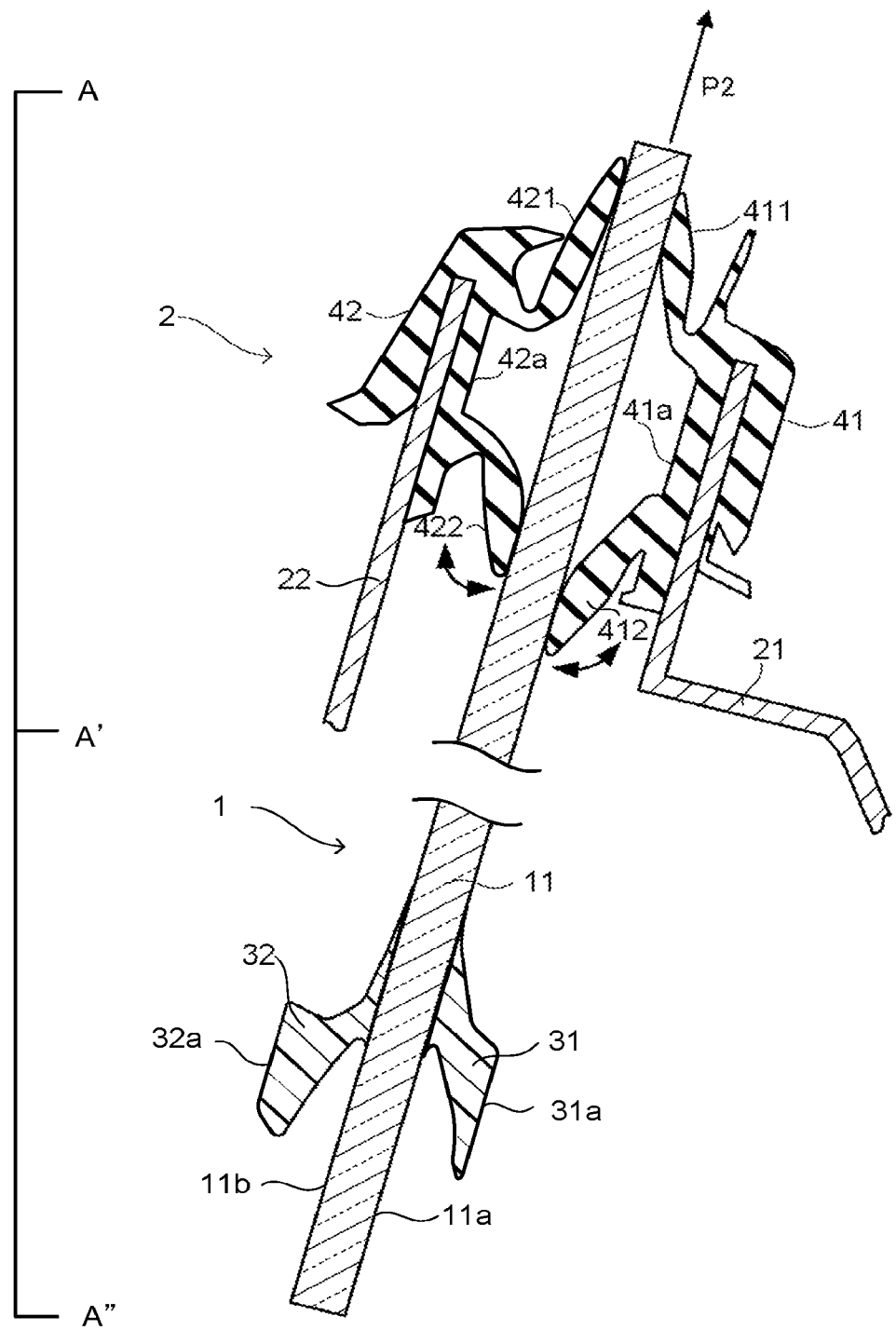
FIG. 2B is an A-A" line cross-sectional view of FIG. 1 which schematically shows a state at a door glass fully opened time in the example of the beltline portion sound insulating structure of the present invention.

FIG. 1 shows a side view of an automobile that has a beltline portion sound insulating structure being an example of the embodiment which is shown in FIG. 2A and FIG. 2B. In the automobile 10 shown in FIG. 1, front and rear side doors S are each constituted by a door panel 2 and a door glass 1 which is provided in the door panel 2 in a liftable manner, and FIG. 1 shows the automobile 10 in a state where the door glass 1 is closed.

In the side door S, the door panel 2 has two panel boards (not shown) facing each other, and the door glass 1 is freely openable and closable by being provided between the two panel boards in the liftable manner. The door glass 1 being freely openable and closable means that a window opening portion W positioned in an upside of the side door S is free to be opened and closed by the door glass 1 being raised and lowered. In other words, at a door glass 1 closed time, the window opening portion W is closed by the door glass 1, and at a door glass 1 opened time, the widow opening portion W is in a state of being opened. In the present specification, among the two panel boards which the door panel has, the panel board positioned on the automobile interior side is referred to as an inner panel and the panel board positioned on the automobile exterior side is referred to as an outer panel.

In the automobile 10, a beltline L is a line connecting upper ends of the front and rear door panels 2. In the present invention, a region having a predetermined width from the upper ends of the door panels 2 toward a downside along the beltline L is referred to as a beltline portion, and indicated by "Ls" in FIG. 1. The side door S of the automobile 10 has a configuration which enables a structure for sound insulation in the belt line portion Ls at the door glass 1 closed time.

FIG. 2A is an A-A' line cross-sectional view of FIG. 1 which schematically shows a state at the door glass closed time in an example of a beltline portion sound insulating structure of the present invention. FIG. 2B is an A-A" line cross-sectional view which schematically shows a state at a door glass fully opened time in the example of the beltline portion sound insulating structure of the present invention. Note that a dotted line shown in the door panels 2 of FIG. 1 indicates a position of a lower end of the door glass 1 at the time that the door glass 1 is lowered to the lowest level, making the window opening portion W fully opened. The A-A" line cross-sectional view of FIG. 1 which FIG. 2B shows includes a cross-sectional view of the entire door glass 1.

The sound insulating structure (hereinafter, sometimes referred to as a sound insulating structure (1)) of the beltline portion Ls illustrated in FIG. 2A will be described. The door panel 2 has the inner panel 21 and the outer panel 22 as the two panel boards facing each other, and the door glass 1 is provided between the inner panel 21 and the outer panel 22 in the liftable manner. The inner panel 21 and the outer panel 22 have, in the belt line portions being regions along the beltline of facing surfaces, an inner seal member 41 and an outer seal member 42, respectively, which seal between the inner panel 21 and the outer panel 22, and the door glass 1.

The inner seal member 41 has two lip portions vertically on a door glass 1 side, that is, an upper inner lip 411 and a lower inner lip 412, while the outer seal member 42 similarly has an upper outer lip 421 and a lower outer lip 422 on a door glass 1 side.

The door glass 1 has a door glass main body 11 and, in a lower portion of its automobile interior side main surface 11a, a first viscoelastic member 31 whose Young's modulus is lower than that of the inner seal member 41 positioned on a surface of the inner panel 21 facing to the automobile interior side main surface 11a of the door glass main body 11, as a full cross-sectional view of the door glass 1 is shown in FIG. 2B. Further, the door glass 1 has, in a lower portion of an automobile exterior side main surface 11b of the door glass main body 11, a second viscoelastic member 32 whose Young's modulus is lower than that of the outer seal member 42 positioned on a surface of the outer panel 22 facing to the automobile exterior side main surface 11b of the door glass main body 11.

As shown in FIG. 2A, at the door glass 1 closed time, the first viscoelastic member 31 which the door glass 1 has is positioned between the upper inner lip 411 and the lower inner lip 412 of the inner seal member 41, and further, an outer peripheral surface of the first viscoelastic member 31 is in contact with substantially an entire surface of an inner peripheral surface which is facing to the automotive interior side main surface 11a of the door glass main body 11, namely an inner peripheral surface on the door glass 1 side, of the inner seal member 41. Further, similarly, the second viscoelastic member 32 which the door glass 1 has is positioned between the upper outer lip 421 and the lower outer lip 422 of the outer seal member 42, and further, an outer peripheral surface of the second viscoelastic member 32 is in contact with substantially an entire surface of an inner peripheral surface which is facing to the automotive exterior side main surface 11b of the door glass main body 11, namely an inner peripheral surface on the door glass 1 side, of the outer seal member 42. The "substantially an entire surface" means the surface having area of 90% or more of the area of an entire surface in the present specification.

According to the sound insulating structure (1) shown in FIG. 2A, as a result that the first viscoelastic member 31 is in contact with the inner seal member 41 leaving no gap therebetween and further the second viscoelastic member 32 is in contact with the outer seal member 42 leaving no gap therebetween, a gap between the door glass 1 and the door panel 2 is sealed. Thus, it is possible to sufficiently suppress an amount of sound intruding into the automobile interior via the beltline portion at the door glass closed time.

According to the sound insulating structure (1) of a configuration shown in FIG. 2A, further, the first viscoelastic member 31 forms a constraining type vibration suppressing structure as a result of being constrained by the door glass main body 11 between the inner seal member 41 and the inner panel 21, and further, the second viscoelastic member 32 forms a constraining type vibration suppressing structure as a result of being constrained by the door glass main body 11 between the outer seal member 42 and the outer panel 22. Thereby, vibration of the door glass main body 11 is sufficiently suppressed, and a high sound insulating effect in the automobile interior at the door glass closed time can be realized. Note that as a cause of vibration of the door glass, there can be cited propagation of road noise from a door panel to a door glass, propagation of engine noise, and so on. According to the beltline portion sound insulating structure of the present invention, vibration of the door glass due to either cause is able to be suppressed sufficiently.

FIG. 2B is an A-A" line cross-sectional view of FIG. 1 which schematically shows a state at the door glass fully opened time of the sound insulating structure (1), whose state at the door glass closed time is shown in FIG. 2A. In FIG. 2B, with regard to the door panel 2, only the beltline portion Ls, that is, an A-A' line cross-sectional surface of FIG. 1 is shown and illustration of a lower portion thereunder is omitted. The door glass 1 shown in FIG. 2A can be lowered in an arrow P1 direction, and a state where the door glass 1 is completely lowered is shown in FIG. 2B. In FIG.

2B, the door glass 1 can be raised in an arrow P2 direction, and a state where the door glass 1 is completely raised is shown in FIG. 2A.

At the door glass fully opened time shown in FIG. 2B, the door glass 1 exists in a manner that an upper end of the door glass main body 11 protrudes somewhat above the upper inner lip 411 and the upper outer lip 421 of the inner seal member 41 and the outer seal member 42. However, a position of the upper end of the door glass main body 11 is not limited to the above and is altered appropriately by design of a side door of an automobile. At the door glass fully opened time shown in FIG. 2B, the inner seal member 41 and the outer seal member 42 are similar to those in the state at the the door glass closed time shown in FIG. 2A, except that the lower inner lip 412 and the lower outer lip 422 point their tip portions downward respectively.

When the door glass 1 is raised in the P2 direction, for example, with insertion of the viscoelastic member 31 and the viscoelastic member 32 into the two lips of the inner seal member 41 and the outer seal member 42 respectively, the tip portions of the lower inner lip 412 and the lower outer lip 422 shown in FIG. 2B change orientations in directions of arrows shown in neighborhoods of respective members, and finally come into the state at the door glass closed time shown in FIG. 2A. The first viscoelastic member 31 and the second viscoelastic member 32 which the door glass 1 has are provided in predetermined positions respectively in the automobile interior side main surface 11a lower portion and the automobile exterior side main surface 11b lower portion of the door glass main body 11 so that the respective first viscoelastic member 31 and second viscoelastic member 32 are positioned between the upper inner lip 411 and the lower inner lip 412 as well as between the upper outer lip 421 and the lower outer lip 422 at the door glass closed time shown in FIG. 2A.

Here, the sound insulating structure (1) shown in FIG. 2A and FIG. 2B is one example of the sound insulating structure of the present invention, and modification of the configuration is possible within the scope of the present invention. For example, in the sound insulating structure (1), the door glass 1 is configured to have the first viscoelastic member 31 and the second viscoelastic member 32 in the automobile interior side main surface 11a lower portion and the automobile exterior side main surface 11b lower portion of the door glass main body 11, respectively, but the sound insulating structure of the present invention is not necessarily required to be configured to have both the first viscoelastic member 31 and the second viscoelastic member 32, and it suffices that the sound insulating structure of the present invention has the viscoelastic member in either one of the sides. In such a case, the side which has the viscoelastic member may be either the automobile interior side or the automobile exterior side, and preferably is the automobile interior side. More preferably, the sound insulating structure of the present invention is configured to have viscoelastic members on both the automobile interior side and the automobile exterior side.

Hereinafter, each component of the sound insulating structure of the present invention will be described with the sound insulating structure (1) shown in FIG. 2A and FIG. 2B being an example. Note that in the following explanation, a configuration of only the automobile interior side of the sound insulating structure (1) with the door glass 1 will be described mainly, a configuration of the automobile exterior side can be similar thereto. Further, in the sound insulating structure (1), the configuration of the automobile interior side and the configuration of the automobile exterior side are not required to be completely the same, and with regard to each component, for example, a shape, a kind of material or the like of each component can be each selected accordingly within the scope of the present invention described below. Further, the configuration of the automobile interior side of the following sound insulating structure (1) is also applicable to a case where the sound insulating structure of the present invention is configured to have the viscoelastic member only on the automobile interior side or on the automobile exterior side.

Door Glass 1

The door glass main body 11 which the door glass 1 has is not particularly limited as long as the door glass main body 11 is a transparent plate-shaped body which is normally used for the automobile window. As for its shape, a plate-shaped or curved one can be cited. A shape of the main surface is a shape to conform to a window opening portion of the automobile on which the door glass 1 is mounted. The plate-shaped body may be a general-purpose flat glass, a tempered glass, a double glazing, a laminated glass or a wire inserted glass. As a kind of material of the plate-shaped body, there can be cited a transparent glass, a resin (what is called an organic glass) and so on. A thickness of the plate-shaped body is approximately 2.8 to 5.0 mm, depending on the kind of the automobile.

As the glass, concretely, there can be cited a normal soda lime glass, a borosilicate glass, a non-alkali glass, a quartz glass and so on. As the glass, it is also possible to use a glass which absorbs ultraviolet ray or infrared ray. Further, as the resin, there can be cited an acryl-based resin such as a polymethyl methacrylate, an aromatic polycarbonate-based resin such as a polyphenylene carbonate, a polystyrene resin, and so on.

The first viscoelastic member (hereinafter, also referred to simply as the "viscoelastic member") 31 provided in the automobile interior side main surface 11a lower portion of the door glass main body 11 is made of a viscoelastic material with a lower Young's modulus compared with a material constituting the inner seal member 41 described later, and has a sound insulating property and a vibration suppressing property. An arrangement position of the viscoelastic member 31 is a predetermined position in order for being positioned between the upper inner lip 411 and the lower inner lip 412 of the inner seal member 41 at the door glass closed time shown in FIG. 2A.

A shape of the outer peripheral surface of the viscoelastic member 31 depends on a shape of the inner peripheral surface on the door glass 1 side of the inner seal member 41. In the sound insulating structure (1), at the door glass closed time shown in FIG. 2A, the viscoelastic member 31 has a shape such that its outer peripheral surface is in contact with substantially an entire surface of the inner peripheral surface on the door glass 1 side of the inner seal member 41. However, in the sound insulating structure of the present invention, it not necessarily required that the outer peripheral surface of the viscoelastic member 31 is in contact with the entire surface of the inner peripheral surface on the door glass 1 side of the inner seal member 41, and at the door glass closed time it suffices that the viscoelastic member 31 is positioned between the two inner lips and that the viscoelastic member 31 abuts on at least a part of the inner seal member 41. By the above configuration, in the sound insulating structure of the present invention, it is possible to simultaneously obtain closing of the gap between the door glass and the door panel and a constraining type vibration suppressing structure to the door glass. Note that a configuration is preferable in which the outer peripheral surface of the viscoelastic member 31 is in contact with the entire surface of the inner peripheral surface on the door glass 1 side of the inner seal member 41 as shown in FIG. 2A, since a high sound insulating performance by closing of the gap and vibration suppression of the door glass can be obtained.

Here, in the sound insulating structure (1), an outer peripheral surface of the first viscoelastic member 31 has a surface 31a which is substantially parallel to the automobile interior side main surface 11a of the door glass main body 11, the inner seal member 41 has a surface 41a substantially parallel to and facing the automobile interior side main surface 11a of the door glass main body 11 between the upper inner lip 411 and the lower inner lip 412, and at the door glass closed time, the surface 31a of the first viscoelastic member 31 is in contact with the surface 41a of the inner seal member 41 in a manner that substantially the entire thereof coincides. Further, similarly, an outer peripheral surface of the second viscoelastic member 32 has a surface 32a which is substantially parallel to the automobile exterior side main surface 11b of the door glass main body 11, the outer seal member 42 has a surface 42a substantially parallel to and facing the automobile exterior side main surface 11b of the door glass main body 11 between the upper outer lip 421 and the lower outer lip 422, and at the door glass closed time, the surface 32a of the second viscoelastic member 32 is in contact with the surface 42a of the outer seal member 42 in a manner that substantially the entire thereof coincides. The "one surface substantially parallel to other surface" means that an angle which one surface and other surface make is 10 degree or less in the present specification.

The constraining type vibration suppressing structure to the door glass is preferable to have a configuration in which the viscoelastic member is sandwiched between the main surface of the door glass main body and the surface (provided that the surface is constituted by a member with a Young's modulus higher than that of the sandwiched viscoelastic member) which is parallel to the main surface, as described above. From such a point of view, as the configuration in which the viscoelastic member 31 abuts on at least a part of the inner seal member 41 at the door glass closing time as described above, the sound insulating structure of the present invention is preferable to have a configuration in which the inner seal member 41 has the surface 41a substantially parallel to and facing the automobile interior side main surface 11a of the door glass main body 11 between two lip portions to sandwich the viscoelastic member 31 at the door glass closing time, i.e., the upper inner lip 411 and the lower inner lip 412 in FIG. 2A, and the viscoelastic member 31 is in contact with at least substantially the entire surface of the surface 41a of the inner seal member 41 at the door glass closed time.

In this case, for example, if substantially the entire surface of the surface substantially parallel to and facing the automobile interior side main surface of the door glass main body of the inner seal member is in contact with the viscoelastic member, a lower surface of the upper inner lip portion or an upper surface of the lower inner lip portion is not necessarily required to be in contact with the viscoelastic member, but the configuration shown in FIG. 2A is more preferable.

Note that it is not necessarily required that a cross-sectional shape of the viscoelastic member 31 at the door glass closed time such as shown in FIG. 2A, coincides with that at the door glass opened time such as shown in FIG. 2B. It suffices that the shape is such that the viscoelastic member 31 is positioned between the two inner lips and that the viscoelastic member 31 abuts on at least a part of the inner seal member 41 at the door glass closed time. For example, the viscoelastic member 31 may be elastically transformable and may have a configuration in which a thickness of the viscoelastic member 31 is decreased at the door glass closed time compared with the door glass opened time, and such a configuration is preferable in view of securely closing the gap between the door glass and the door panel, concretely, the seal member which the door panel has.

The viscoelastic member 31 is provided in the predetermined position in the automobile interior side main surface 11a lower portion of the door glass main body 11. The viscoelastic member 31 is preferable to extend horizontally between right and left ends of the door glass main body 11, that is, in parallel with the belt line L, in a horizontal direction, but is not necessarily required to extend continually. In terms of obtaining a sound insulating effect by closing of the gap between the door glass and the door panel and by the constraint type vibration suppressing structure to the door glass at a high level, the viscoelastic member 31 is preferable to be provided in the predetermined position in a vertical direction of the automobile interior side main surface 11a of the door glass main body 11, continually between the right and left ends.

In a case where the second viscoelastic member 32 is provided in the predetermined position of the automobile exterior side main surface 11b lower portion of the door glass main body 11 as shown in FIG. 2A, from a viewpoint of obtaining the sound insulating effect at the high level, the second viscoelastic member 32 is preferable to be provided in a predetermined position in a vertical direction of the automobile exterior side main surface 11b of the door glass main body 11, continually between the right and left ends. However, on the automobile exterior side of the door glass 1, rainwater or the like intrudes between the door glass main body 11 and the outer seal member 42. Thus, considering good drainage of the rainwater or the like, the viscoelastic member may partially have a slit in the horizontal direction when the viscoelastic member is provided on the automobile exterior side.

As long as the viscoelastic member 31 is constituted by a material (hereinafter, also referred to as a "viscoelastic material") with a viscoelasticity which has a lower Young's modulus compared with a material constituting the later-described inner seal member 41, a kind of material is not particularly limited. Note that the Young's modulus in the present specification is a Young's modulus ($N/m^2$) measured at 20° C. if not particularly stated. Note that the Young's modulus of the viscoelastic material constituting the viscoelastic member 31 is required to satisfy a condition of being lower compared with a Young's modulus of the material constituting the inner seal member 41.

As the viscoelastic material constituting the viscoelastic member 31, there can be used, concretely, a synthetic rubber such as an ethylene propylene rubber (EPDM rubber), a thermoplastic elastomer resin such as a polyolefin based elastomer, a polyurethane resin, a polyvinyl chloride resin, an epoxy resin or the like, depending on the material constituting the inner seal member 41 used together.

Further, the viscoelastic member 31 may be constituted by a viscoelastic material made of a foam. In a case where the viscoelastic member 31 is constituted by the foam, the viscoelastic member 31 can be formed, for example, by foaming the above-described viscoelastic material by a conventional means. Thereby, the Young's modulus or a loss coefficient of the viscoelastic member 31 can be adjusted at a desired value.

Further, the material constituting the viscoelastic member 31 may be a viscoelastic material obtained by adding a filler such as an organic filler, a mineral filler or the like to the viscoelastic material made of the resin described above. As the organic filler, there is used, for example, a resin particle formed of a resin such as a cross-linked polyester, a polystyrene, a styrene acrylic copolymer resin or a urea resin, a synthetic fiber, or a natural fiber. As the mineral filler, there is used, for example, a calcium carbonate, a calcium oxide, a magnesium hydroxide, a magnesium oxide, a magnesium carbonate, an aluminum hydroxide, a barium sulfate, a barium oxide, a titanium oxide, an iron oxide, a zinc oxide, a zinc carbonate, a clay such as a pyrophylite clay, a kaolin clay or a baked clay, mica, diatomaceous earth, carbon black, a silica, a glass fiber, a carbon fiber, a fiber filler, a nonorganic filler such as glass balloon, or the like. By using such a viscoelastic member obtained by adding the filler to the viscoelastic material made of the resin, the Young's modulus or the loss coefficient of the viscoelastic member 31 can be adjusted at the desired value.

Further, in the viscoelastic member 31, it is preferable that a Young's modulus E (N/m$^2$) at 20° C. and a loss coefficient tanδ at 20° C. and at 4000 Hz in frequency satisfy the following formula (1). Hereinafter, the loss coefficient indicates a value at 20° C. and at 4000 Hz in frequency as long as not particularly stated.

[Formula (1)]

$$E \geq 2.64 \times 10^2 \frac{1 + \tan^2 \delta}{\tan \delta} \quad (1)$$

In the above, the Young's modulus E is an index to measure a hardness of the viscoelastic member 31, and the loss coefficient tanδ is an index to measure a viscosity of the viscoelastic member 31. As a result that the Young's modulus E and the loss coefficient tanδ are in ranges satisfying the above formula (1), the viscoelastic member 31 can sufficiently exhibit a vibration suppression effect to the door glass 1 in the constraining type vibration suppressing structure as described above.

In the viscoelastic member 31, it is more preferable that the above-described loss coefficient tanδ satisfies the following formula (2).

[Formula (2)]

$$E \geq 1.65 \times 10^5 \frac{1 + \tan^2 \delta}{\tan \delta} \quad (2)$$

As the viscoelastic member 31 satisfying relations of the above-described formulas (1) and (2), for example, MTS-20 (brand name) manufactured by HAYAKAWA RUBBER CO., LTD. can be cited, but the viscoelastic member 31 is not limited thereto.

Providing the viscoelastic member 31 in the automobile interior side main surface 11a of the door glass main body 11 is carried out by adhesion. An adhesion method is not particularly limited as long as the adhesion method enables an adhesive strength sustainable against a force to tear off the viscoelastic member 31 which occurs when the viscoelastic member 31 is inserted into between the two lips of the inner seal member 41, that is, between the upper inner lip 411 and the lower inner lip 412 or dislocated from between the lips by opening and closing of the door glass 1. Concretely, adhesion can be carried out by a well-known double-sided adhesive tape, an adhesive agent or the like.

Note that the door glass of the above-described configuration which is used for the sound insulating structure of the present invention can be used singly as an automobile door glass of the present invention Door Panel 2

The inner panel 21 and the outer panel 22 which the door panel 2 has are not particularly limited in terms of a kind of material and a shape, as long as the inner panel 21 and the outer panel 22 are panel boards which normally constitute a door panel of an automobile side door. As for the inner seal member 41 and the outer seal member 42 which the inner panel 21 and the outer panel 22 have in regions along the beltline L in the facing surfaces respectively, the inner seal member 41 and the outer seal member 42 being for sealing between the door panel 2 and the door glass 1, only the inner seal member 41 on the surface of the inner panel 21 facing to the automobile interior side main surface 11a of the door glass main body 11 will be described similarly to the above.

In the sound insulating structure (1), the inner seal member 41 is constituted by the material which has the Young's modulus higher than that of the material constituting the viscoelastic member 31 but has the Young's modulus suitable to function similarly to a sealing member normally used for a beltline portion, and has the two lip portions vertically on the door glass 1 side, that is, the upper inner lip 411 and the lower inner lip 412. In the sound insulating structure of the present invention, it suffices that the inner seal member 41 has at least two lip portions positioned to sandwich the viscoelastic member 31 while abutting on at least a part of the viscoelastic member 31 at the door glass closed time. The number of the lip portions which the inner seal member 41 has is not particularly limited as long as the number is two or more, but the number is preferable to be two in view that a volume of a space to sandwich the viscoelastic member 31 can be secured large and in view of a manufacturing cost.

A shape of the inner seal member 41 is not particularly limited as long as the shape enables sealing between the inner panel 21 and the door glass 1 at the door glass closed time by the two lip portions which the inner seal member 41 has vertically on the door glass 1 side, that is, by the upper inner lip 411 and the lower inner lip 412. The shapes of the upper inner lip 411 and the lower inner lip 412 are shapes which seal between the inner panel 21 and the door glass 1 and enable sandwiching the viscoelastic member 31 between the upper inner lip 411 and the lower inner lip 412, at the door glass closed time.

As described above, in the sound insulating structure (1), the viscoelastic member 31 has a shape in which its outer peripheral surface is in contact with substantially the entire surface of the inner peripheral surface on the door glass 1 side of the inner seal member 41, at the door glass closed time shown in FIG. 2A. Here, the inner peripheral surface on the door glass 1 side of the inner seal member 41 is constituted by the lower surface of the upper inner lip 411, the upper surface of the lower inner lip 412, and the surface 41a substantially parallel to and facing the automobile interior side main surface 11a of the door glass main body 11, the surface 41a being positioned between the upper inner lip 411 and the lower inner lip 412.

As described above, it is preferable that the inner seal member 41 has the shape in which its inner peripheral surface coincides with the outer peripheral surface of the viscoelastic member 31. Further, it is preferable that the inner seal member 41 has the surface 41a substantially parallel to and facing the automobile interior side main surface 11a of the door glass main body 11 between the upper inner lip 411 and the lower inner lip 412. By adopting such a configuration, it is possible to sufficiently close the gap between the door glass 1 and the door panel 2, concretely, the gap between the door glass main body 11 and the inner seal member 41, and simultaneously construct a vibration suppressing structure to the door glass main body 11 in which the door glass main body 11 and the inner seal member 41 constrain the viscoelastic member 31, at the door glass closed time.

Here, at the door glass fully opened time shown in FIG. 2B, with regard to the inner seal member 41 and the outer seal member 42, the lower inner lip 412 and the lower outer lip 422 point their tip portions downward respectively. The tip portions of the lower inner lip 412 and the lower outer lip 422 shown in FIG. 2B change their orientations in the directions of the arrows shown in the neighborhoods of the respective members when the door glass 1 is raised in the P2 direction, and finally come into the state at the door glass closed time shown in FIG. 2A.

The lip portions which the inner seal member 41 and the outer seal member 42 have are preferable, for example, to have shapes and/or is formed of a material which enable(s) change of orientations of the tip portions in accordance with raising and lowering of the door glass 1 as described above.

From the above viewpoint, the inner seal member 41 and the outer seal member 42 can be formed of the synthetic rubber such as EPDM, the thermoplastic elastomer such as a polyolefin based elastomer, or the like. However, it is essential that the composing material of the first viscoelastic member 31 and the composing material of the second viscoelastic member 32 are materials with lower Young's moduli compared with the composing materials of the inner seal member 41 and the outer seal member 42 respectively. Further, the composing material of the first viscoelastic member 31 and the composing material of the second viscoelastic material 32 are more preferable to satisfy the formula (1).

Note that in the inner seal member 41, it is also possible to configure only the lip portions by a material different from the above, but it is preferable that the inner seal member 41 as a whole including the lip portions is constituted by the same material in view of economic efficiency. The same applies to the outer seal member 42.

Note that in the sound insulating structure of the present invention, in a case of a configuration in which a door glass has a viscoelastic member only in one main surface of a door glass main body, a sealing member on a surface of the panel board facing to the other main surface of the door glass main body can have a configuration similar to that of a normal seal member. In a configuration of the normal seal member, for example, the number of lip portions may be at least one.

What is claimed is:

1. An automobile beltline portion sound insulating structure formed along a beltline of an automobile, comprising:
   a door panel comprising two panel boards facing each other, and
   a door glass freely openable and closable and provided between the two panel boards in a liftable manner, wherein
   the two panel boards comprise seal members sealing between the door panel and the door glass in regions along the beltline of facing surfaces respectively,
   the door glass comprises a door glass main body and a first viscoelastic member in a lower portion of one main surface of the door glass main body,
   the first viscoelastic member has a Young's modulus lower than that of a seal member positioned on a surface of the panel board facing to the one main surface of the door glass main body,
   the seal member positioned on the surface of the panel board facing to the one main surface comprises at least two lip portions on a side of the door glass, and
   the first viscoelastic member is positioned between the at least two lip portions while abutting on at least a part of the seal member positioned on the surface of the panel board facing to the one main surface, at a door glass closed time, to insulate sound between the door panel and the door glass.

2. The automobile beltline portion sound insulating structure according to claim 1, wherein the seal member positioned on the surface of the panel board facing to the one main surface of the door glass has a surface substantially parallel to and facing the one main surface of the door glass main body between the at least two lip portions, and the first viscoelastic member is in contact with substantially an entire surface of the substantially parallel surface of the seal member positioned on the surface of the panel board facing to the one main surface at the door glass closed time.

3. The automobile beltline portion sound insulating structure according to claim 2, wherein an outer peripheral surface of the first viscoelastic member is in contact with substantially an entire surface of facing surfaces of the at least two lip portions each other and the surface substantially parallel to and facing the one main surface of the door glass main body of the seal member positioned on the surface of the panel board facing to the one main surface of the door glass main body, at the door glass closed time.

4. The automobile beltline portion sound insulating structure according to claim 1, wherein the first viscoelastic member is elastically transformable, and a thickness of the first viscoelastic member is decreased at the door glass closed time compared with a door glass open time.

5. The automobile beltline portion sound insulating structure according to claim 1, wherein the one main surface of the door glass main body is a main surface on an automobile interior side.

6. The automobile beltline portion sound insulating structure according to claims 1,
   wherein
   the door glass further comprises a second viscoelastic member in a lower portion of the other main surface of the door glass main body, the second viscoelastic member having a Young's modulus lower than that of the seal member positioned on a surface of the panel board facing to the other main surface of the door glass main body,
   the seal member positioned on the surface of the panel board facing to the other main surface has at least two lip portions on the side of the door glass, and
   the second viscoelastic member is positioned between the at least two lip portions while abutting on at least a part of the seal member positioned on the surface of the panel board facing to the other main surface, at the door glass closed time.

7. The automobile beltline portion sound insulating structure according to claim 6, wherein the seal member positioned on the surface of the panel board facing to the other main surface of the door glass main body has a surface substantially parallel to and facing the other main surface of the door glass main body between the at least two lip portions, and the second viscoelastic member is in contact with substantially an entire surface of the substantially parallel surface of the seal member positioned on the surface of the panel board facing to the other main surface at the door glass closed time.

8. An automobile door glass for the automobile beltline portion sound insulating structure according to claim 1, wherein the automobile door glass is made of a glass plate on which the first viscoelastic member is mounted.

\* \* \* \* \*